(12) United States Patent
Thomas

(10) Patent No.: US 6,787,988 B2
(45) Date of Patent: Sep. 7, 2004

(54) PROCESS FOR TREATING PREVIOUSLY COATED PHOSPHOR PARTICLES

(75) Inventor: Alan C. Thomas, Gilbert, AZ (US)

(73) Assignee: Durel Corporation, Chandler, AZ (US)

( * ) Notice: Subject to any disclaimer, the term of this patent is extended or adjusted under 35 U.S.C. 154(b) by 44 days.

(21) Appl. No.: 10/008,051

(22) Filed: Nov. 13, 2001

(65) Prior Publication Data

US 2003/0098644 A1 May 29, 2003

(51) Int. Cl.[7] .................................................. H01J 1/62
(52) U.S. Cl. ................................. 313/503; 313/502
(58) Field of Search ................................ 313/503, 502, 313/483; 427/377, 64, 215, 217, 220, 226, 58; 428/403, 282, 446; 525/453; 430/311; 439/503, 502

(56) References Cited

U.S. PATENT DOCUMENTS

| | | | | |
|---|---|---|---|---|
| 3,920,865 A | | 11/1975 | Läufer et al. | ............... 427/220 |
| 5,151,215 A | | 9/1992 | Sigai | .................... 252/301.6 F |
| 5,220,243 A | | 6/1993 | Klinedinst | ................... 313/502 |
| 5,593,782 A | | 1/1997 | Budd | .......................... 428/403 |
| 5,935,638 A | * | 8/1999 | Chandra et al. | |
| 6,271,333 B1 | * | 8/2001 | Okuhira | ....................... 528/28 |
| 6,346,326 B1 | | 2/2002 | Yocom | ....................... 428/403 |

FOREIGN PATENT DOCUMENTS

WO    WO 99/35889    7/1999

OTHER PUBLICATIONS

U.S. patent application Publication, US 2002/0150760 A1, Klinedinst, Published Oct. 17, 2002; Appl. No. 10/115,645, filed Apr. 3, 2002.
*A Guide to Dow Corning Silane Coupling Agents*, Dow Corning 1985; pp. 1–33.

* cited by examiner

*Primary Examiner*—Alex Gilman
(74) *Attorney, Agent, or Firm*—Paul F. Wille

(57) ABSTRACT

Particles of electroluminescent phosphor having a moisture proof coating are re-coated by treating the phosphor in a fluidized bed with a mixture of water vapor and an organotrichlorosilane compound for approximately thirty minutes. The resultant siloxane coating further improves the moisture resistance of the phosphor.

10 Claims, 7 Drawing Sheets

PROCESS FOR TREATING PREVIOUSLY COATED PHOSPHOR PARTICLES

BACKGROUND OF THE INVENTION

This invention relates to the manufacture of fine particles of phosphor for electroluminescent (EL) lamps and, in particular, to a process for treating previously coated phosphor particles to improve electrical stability without impairing brightness.

An EL panel is essentially a capacitor having a dielectric layer between two conductive electrodes, one of which is a transparent metal layer, such as indium tin oxide (ITO). The dielectric layer includes a copper doped ZnS phosphor powder or there is a separate layer of phosphor powder adjacent the dielectric layer. The phosphor powder radiates light in the presence of a strong electric field, using very little current.

EL phosphor particles are zinc sulfide-based materials, commonly including one or more compounds such as copper sulfide ($Cu_2S$), zinc selenide (ZnSe), and cadmium sulfide (CdS) in solid solution within the zinc sulfide crystal structure or as second phases or domains within the particle structure. EL phosphors commonly contain moderate amounts of other materials such as dopants, e.g., bromine, chlorine, manganese, silver, etc., as color centers, as activators, or to modify defects in the particle lattice to modify properties of the phosphor as desired. A copper-activated zinc sulfide phosphor produces blue and green light under an applied electric field and a copper/manganese-activated zinc sulfide produces orange light under an applied electric field. Together, the phosphors produce white light under an applied electric field.

Phosphor particles can be of many sizes, depending on the process and post-process treatment, e.g. milling. EL phosphor particles having an average particle diameter of 1–50$\mu$, preferably 10–40$\mu$, are typically used for screen printed and roll coated EL panels. Phosphor particles that are too large may interfere with formation of very thin phosphor layers, may result in grainy or nonuniform light output, and typically tend to settle too quickly from suspensions during manufacture. Phosphor particles that are too small may degrade more rapidly during use due to increased relative surface area, may agglomerate and not flow freely, and may be difficult to mix with binders in high loadings. The luminance of phosphor degrades with time and usage, more so if the phosphor is exposed to moisture.

It is known in the art to encapsulate phosphors with a moisture resistant coating to improve the performance of the phosphor. Encapsulated phosphor particles are coated with a substantially continuous coating of one or more metal oxides using a fluidized bed reactor. In particular, metal oxide coatings are produced by introducing appropriate precursors in one zone and hydrolysis with water vapor in another zone of the reactor. The fluidized bed maintains agitation and particle separation so coatings can grow on the surface of each particle and not join particles together. The metal oxide coating is substantially transparent and is typically between about 0.1–3.0$\mu$ thick, preferably between about 0.1–0.5$\mu$ thick. Coatings that are too thin may be permeable to moisture. Coatings that are too thick may be less transparent. For example, see U.S. Pat. No. 5,418,062 (Budd), U.S. Pat. No. 5,439,705 (Budd), U.S. Pat. No. 5,593,782 (Budd), U.S. Pat. No. 5,080,928 (Klinedinst), and U.S. Pat. No. 5,220,243 (Klinedinst).

An alumina coating formed as described in the Klinedinst patents tends to react with water to produce aluminum hydroxide ($Al(OH)_3$), which deteriorates lamp materials. Eliminating the alumina coating is not desirable because of the benefits of the coating. U.S. Pat. No. 5,151,215 (Sigai) describes the problem of hydration/solubilization of the alumina coating on fluorescent phosphor particles and proposes heating the particles to a temperature of 700–850° C. to cure the problem. EL phosphors cannot withstand such temperatures unaffected. Thus, the problem remains of overcoming a problem with a coating without giving up the benefits of the coating.

It is known in the art to coat the phosphor particles with polyureasilazane to improve adhesion and hydrolytic stability; e.g. see PCT published application WO 99/35889 (Kosa et al.). Although the process is quite effective, there are problems with disposal of waste solvent and with drying the wet phosphor particles.

It is known that chlorosilane compounds react with water or alcohol to form reactive silanols. Reaction of silanols to bond with an oxide-like surface (containing hydroxyl groups) is normally carried out in inert organic solvent or in the reactive alcohol serving as solvent; see *A Guide to Dow Corning Silane Coupling Agents*, 1985, Dow Corning Corp.

In view of the foregoing, it is therefore an object of the invention to improve the moisture resistance of an EL lamp.

Another object of the invention is to provide an improved process for coating coated phosphor.

A further object of the invention is to provide a new group of materials for coating phosphor particles.

SUMMARY OF THE INVENTION

The foregoing objects are achieved in this invention in which it has been found that providing a second coating on the phosphor particles improves the life, brightness, and moisture resistance of the particles. Specifically, the particles are treated in a fluidized bed reactor with alkyl or arylchlorosilane compounds, which substantially coat the particles and greatly improves the resistance of the phosphor to high temperature, high humidity environments. Volatile chlorosilanes, vapor transported in an inert carrier gas as a water-reactive species, produce siloxane directly on the surface of phosphor particles in a fluidized bed. A new group of surface-active siloxanes for use on coated EL phosphors has been discovered.

BRIEF DESCRIPTION OF THE DRAWINGS

A more complete understanding of the invention can be obtained by considering the following detailed description in conjunction with the accompanying drawings, in which:

FIG. 12 is a cross-section of an EL lamp made with in accordance with the invention.

DETAILED DESCRIPTION OF THE INVENTION

Figure 1:
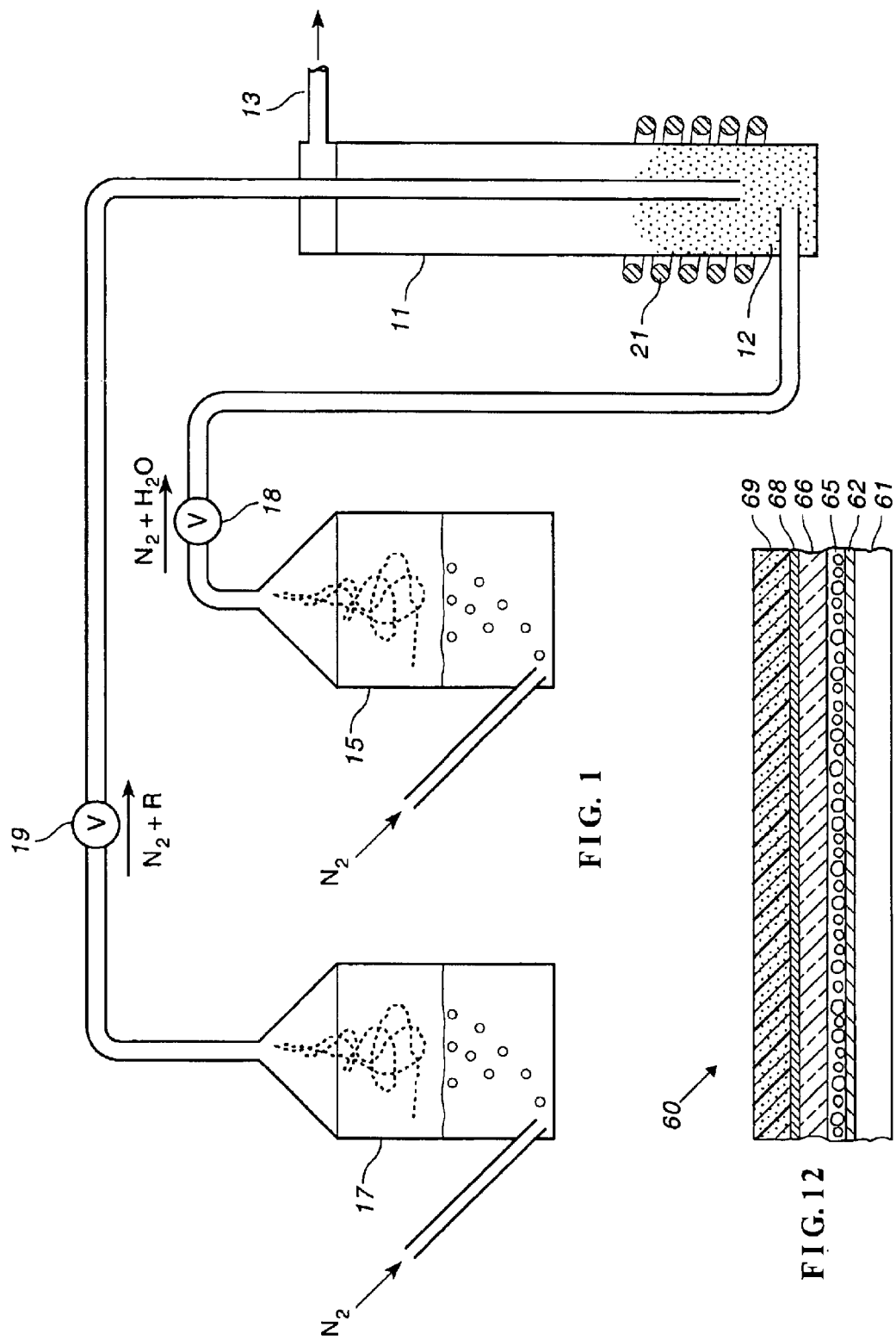
FIG. 1 is a diagram of apparatus suitable for treating phosphor particles in accordance with the invention.

In FIG. 1, fluidized bed reactor 11 is partially filled with a measured quantity of coated phosphor 12. Reactor 11 is covered with glass wool (not shown), if located in a hood, or exhausted to a suitable vent through fitting 13. Water and reagent are separately vaporized in nitrogen carrier gas in chambers 15 and 17. A single nitrogen source (not shown) can be used or separate sources can be used. Valves 18 and 19 are located downstream from chambers 15 and 17. Additional valves or flow meters can be added. Valve 18 controls the flow of water vapor to the bottom of reactor 11 and valve 19 controls the flow of reactant. Heater 21 is preferably not used and the reaction takes place at ambient temperature; e.g. 20°–30° C. Coatings have been applied successfully as high as 150° C. but there is no reason to increase the cost of the process by running at higher than ambient temperature. Valve 18 is opened first and closed last. Valve 19 is opened second and remains open for approximately 30 minutes. After the valves are closed, the doubly coated phosphor is then poured into one or more storage containers. It is not necessary to sieve the phosphor. The reactor can be purged with nitrogen after use. The mechanical aspects of the process are not critical.

The metal oxide coating on the phosphor is believed to have hydroxyl (OH) groups attached to certain elements, principally, silicon, titanium, or aluminum. The silane compound is converted into silanol by hydrolysis in the fluidized bed. The silanol reacts with the hydroxyl groups on the surface of the first coating to bond the silicon to the surface by way of an oxygen atom, thereby forming a second coating that encapsulates the phosphor particle.

Figure 2:
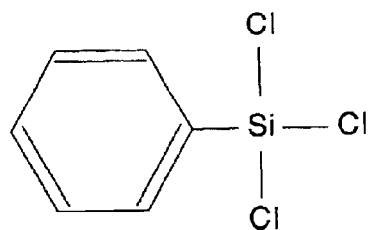
FIG. 2 is the structural formula for phenyltrichlorosilane.
Figure 3:
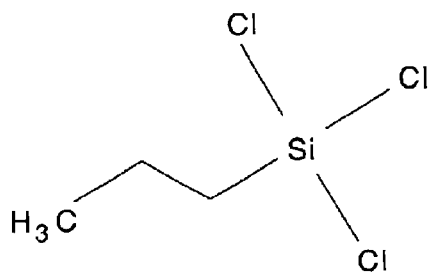
FIG. 3 is the structural formula for n-propyltrichlorosilane.
Figure 4:
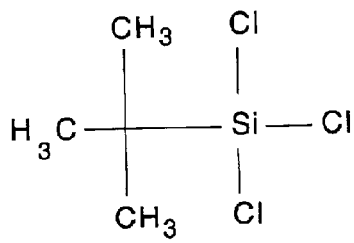
FIG. 4 is the structural formula for tert-butyltrichlorosilane.
Figure 5:
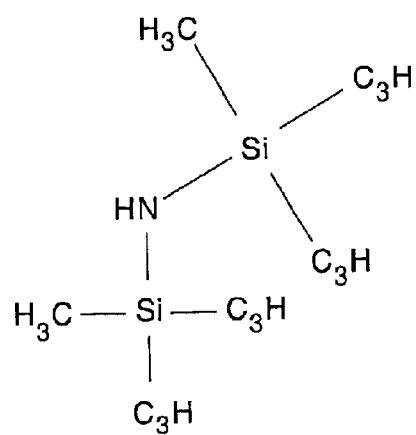
FIG. 5 is the structural formula for hexamethyldisilazane.
Figure 6:
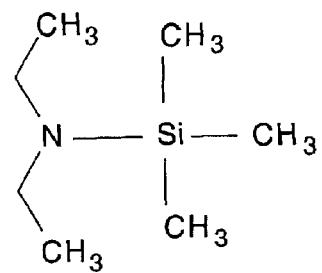
FIG. 6 is the structural formula for diethylaminotrimethylsilane.

EXAMPLE 3700 grams of phosphor powder were placed in a reactor having a diameter of 150 mm. Water vapor flowed at a rate of 6.13 liters per minute and reagent flowed at 1.82 liters per minute for thirty minutes. Phenyltrichlorosilane (PTCS—FIG. 2), n-propyl-trichlorosilane (FIG. 3), and tert-butyltrichlorosilane (FIG. 4) worked successfully. Hexamethyldisilazane (FIG. 5) and diethylaminotrimethylsilane (FIG. 6) did not work.

Use of other organotrichlorosilanes (alkyl and aryl trichlorosilanes) are expected to work. Usefulness may be limited by the volatility of the chlorosilane, i.e. slightly volatile compounds with high molecular weights will not be useful. It is believed that alkoxysilanes and dichloro- and monochlorosilanes will also work. However, the trichloro compounds are most useful because of greater commercial availability, greater reactivity, and better volatility than the alkoxy compounds.

The flows and times are not critical. In another experiment, on 400 gram of phosphor, the flow of water vapor was 3.5 liters per minute and the flow of precursor (PTCS) was 0.6 liters per minute. Because the treatment involve hydrolysis, a predominance of water is preferred. The ratio of water vapor to precursor can be from 2:1 to 8:1 or more. On 4,000 gram samples, times of five minutes and sixty minutes were equally effective.

There are many ways to test EL lamps and it is commercially unrealistic to attempt to test EL lamps exhaustively, that is, for all possible variables. It has been found, for example, that EL lamps powered from an AC supply behave differently from EL lamps powered from an inverter.

Two tests have been found to be reasonable indicators of expected lamp performance. A first test is referred to as the "inverter soak" test in which the lamps are exposed to a relative humidity of 95% at 65° C. The lamps are not powered during exposure but are removed, powered up from an inverter, data taken, and then returned to the humidity chamber. The inverter soak test indicates the relative stability of the lamps in storage. A second test is referred to as the "power supply test" in which the lamps are powered from an AC driven power supply in a chamber having a relative humidity of 95% and a temperature of 65° C. The second test indicates the resistance of the lamps to corrosion and deterioration due to electrochemical effects.

Inverter Soak Test No. 1

A plurality of EL lamps treated as described above with phenyltrichlorosilane were stored at 65° C. and 95 percent humidity, then briefly powered from an inverter while brightness (ft-L) was measured. The lamps were powered at approximately 50 VRMS, 250 Hz.

| Phosphor Hours | 225 DM | 225 RM | 604 DM | 604 RM | 615 DM | 615 RM |
|---|---|---|---|---|---|---|
| 0 | 4.13 | 4.28 | 1.92 | 1.85 | 2.31 | 2.28 |
| 44 | 3.17 | 3.40 | 1.64 | 1.68 | 1.41 | 1.92 |
| 96 | 3.15 | 3.47 | 1.56 | 1.68 | 1.62 | 2.04 |
| 163 | 3.38 | 3.49 | 1.70 | 1.72 | 1.90 | 2.02 |
| 215 | 3.48 | 3.62 | 1.76 | 1.76 | 1.92 | 2.03 |
| 258 | 3.57 | 3.58 | 1.74 | 1.72 | 1.89 | 2.00 |
| 356 | 3.53 | 3.60 | 1.82 | 1.71 | 1.88 | 2.05 |
| 427 | 3.49 | 3.57 | 1.84 | 1.72 | 2.02 | 2.02 |
| 524 | 3.42 | 3.56 | 1.68 | 1.71 | 1.87 | 2.13 |
| 545 | 3.94 | 4.06 | 1.72 | 1.52 | 1.96 | 1.94 |

The three phosphors listed are available from Durel Corporation, Chandler, Ariz. [and are coated with] Type 225 phosphor is a green phosphor, type 604 phosphor is a blue phosphor, and type 615 is a blue-green phosphor. All three phosphors are coated with silicon dioxide and titanium dioxide. "DM" refers to a second coating as described in connection with FIG. 1 using phenyltrichlorosilane. "RM" refers to a second coating as described in the above-identified published PCT application using polyureasilazane.

Figure 7:
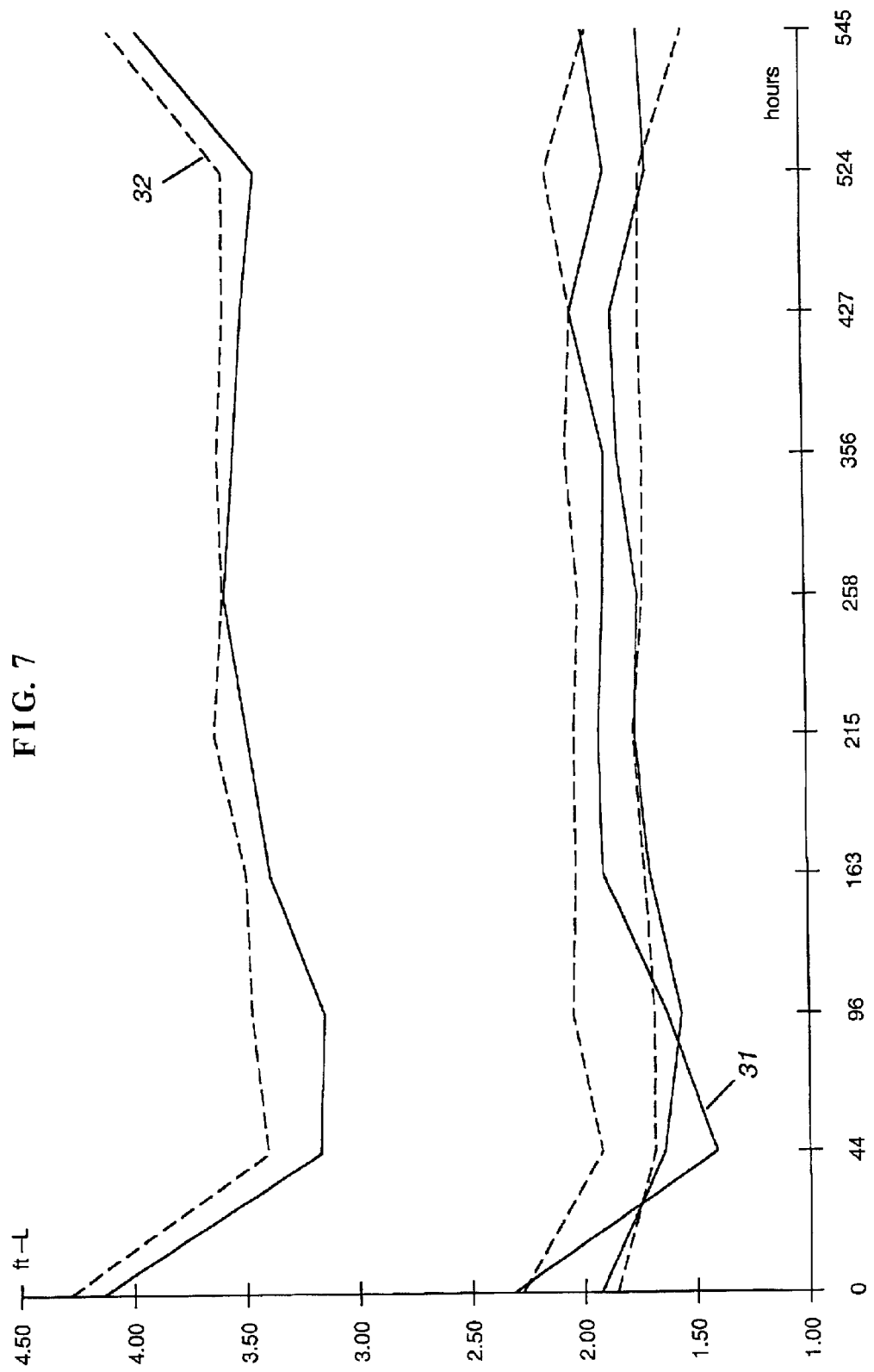
FIG. 7 is a chart of data from a first vapor soak test.

The data is plotted in FIG. 7. In all the following charts, data for lamps coated in accordance with the invention is plotted in solid line and data for lamps coated in accordance with the prior art is plotted in dashed line. The pronounced drop in brightness in the 615DM phosphor at 44 hours (curve 31) is not understood. It may be that the lamps made with 615DM phosphor were tested first and the other samples dried slightly prior to testing.

The last data point for each curve (the row of data at 545 hours in the above table) was taken after the lamps had been removed from the soak chamber and permitted to dry before testing. Except for the 225RM phosphor (curve 32), lamps coated in accordance with the invention recovered better than the other lamps. With all the phosphors and coatings tested, the results are averages of variations in chemistry at a very local level and the averages may shift significantly with small differences in chemistry.

Power Supply Test 1

A plurality of EL lamps treated as described above with phenyltrichlorosilane were stored at 65° C. and 95% humidity while continuously powered from a power supply at 80 VRMS, 200 Hz. Brightness (ft-L) was measured without interrupting power.

| Phosphor Hours | 225 DM | 225 RM | 604 DM | 604 RM | 615 DM | 615 RM |
|---|---|---|---|---|---|---|
| 0 | 8.40 | 8.21 | 4.42 | 4.15 | 6.74 | 6.47 |
| 23 | 8.14 | 7.85 | 4.00 | 3.73 | 6.61 | 6.32 |
| 74 | 6.98 | 6.56 | 3.18 | 2.98 | 5.90 | 5.66 |
| 96 | 6.49 | 6.06 | 2.92 | 2.74 | 5.67 | 5.38 |
| 119 | 6.17 | 5.89 | 2.78 | 2.66 | 5.54 | 5.29 |
| 144 | 5.80 | 5.45 | 2.55 | 2.39 | 5.25 | 4.95 |
| 197 | 5.14 | 4.74 | 2.17 | 2.02 | 4.77 | 4.41 |
| 265 | 4.57 | 4.25 | 1.82 | 1.68 | 4.27 | 3.89 |
| 315 | 4.23 | 3.97 | 1.68 | 1.57 | 4.09 | 3.70 |
| 358 | 4.08 | 3.79 | 1.53 | 1.40 | 3.85 | 3.43 |
| 459 | 3.57 | 3.35 | 1.29 | 1.16 | 3.41 | 3.02 |
| 529 | 3.35 | 3.15 | 1.16 | 1.05 | 3.21 | 2.81 |
| 627 | 3.03 | 2.87 | 1.01 | 0.90 | 2.85 | 2.52 |

Figure 8:
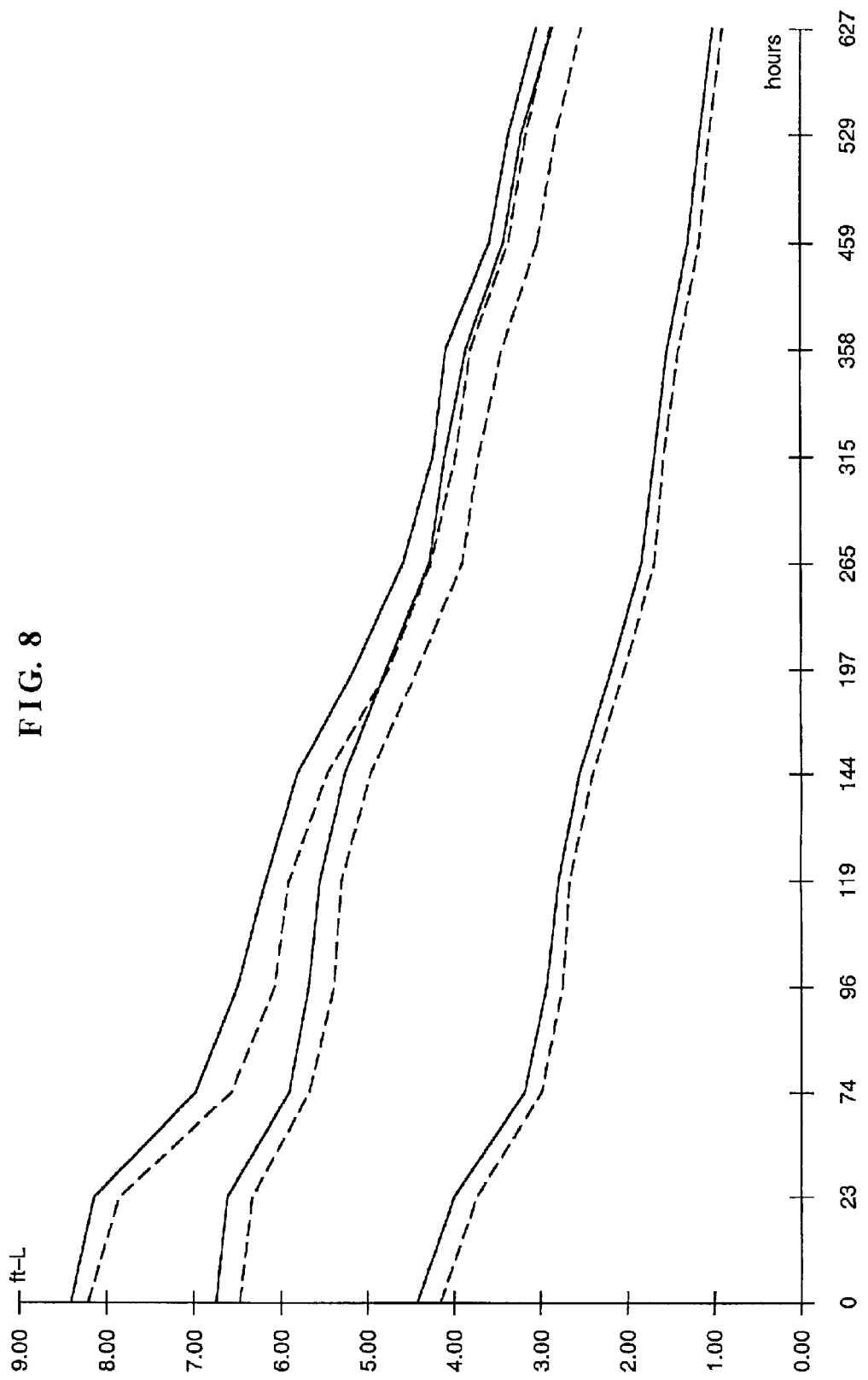
FIG. 8 is a chart of data from a first power supply test.

The data from this test is plotted in FIG. 8. As can be seen, the performance of the lamps coated in accordance with the invention had improved brightness throughout the test.

Power Supply Test 2

A plurality of EL lamps treated as described above with phenyltrichlorosilane were stored at 85° C. (20° higher than Test 1) and 95% humidity while continuously powered from a power supply at 80 VRMS, 200 Hz. Brightness (ft-L) was measured without interrupting power.

| Phosphor Hours | 225 DM | 225 RM | 604 DM | 604 RM | 615 DM | 615 RM |
|---|---|---|---|---|---|---|
| 0 | 8.45 | 8.25 | 4.43 | 4.18 | 6.73 | 6.44 |
| 24 | 7.15 | 6.98 | 3.18 | 3.01 | 6.13 | 5.84 |
| 46 | 5.92 | 5.84 | 2.47 | 2.39 | 5.33 | 5.08 |
| 67 | 5.12 | 5.07 | 2.04 | 2.01 | 4.79 | 4.59 |
| 118 | 3.83 | 3.74 | 1.39 | 1.36 | 3.71 | 3.60 |
| 140 | 3.45 | 3.46 | 1.24 | 1.23 | 3.39 | 3.30 |
| 163 | 3.19 | 3.24 | 1.12 | 1.10 | 3.14 | 3.06 |
| 189 | 2.88 | 2.90 | 0.99 | 0.98 | 2.85 | 2.80 |
| 239 | 2.44 | 2.48 | 0.82 | 0.81 | 2.45 | 2.41 |
| 309 | 1.98 | 2.02 | 0.64 | 0.64 | 1.99 | 1.97 |
| 382 | 1.64 | 1.72 | 0.51 | 0.52 | 1.61 | 1.62 |
| 503 | 1.20 | 1.30 | 0.37 | 0.39 | 1.15 | 1.20 |

Figure 9:
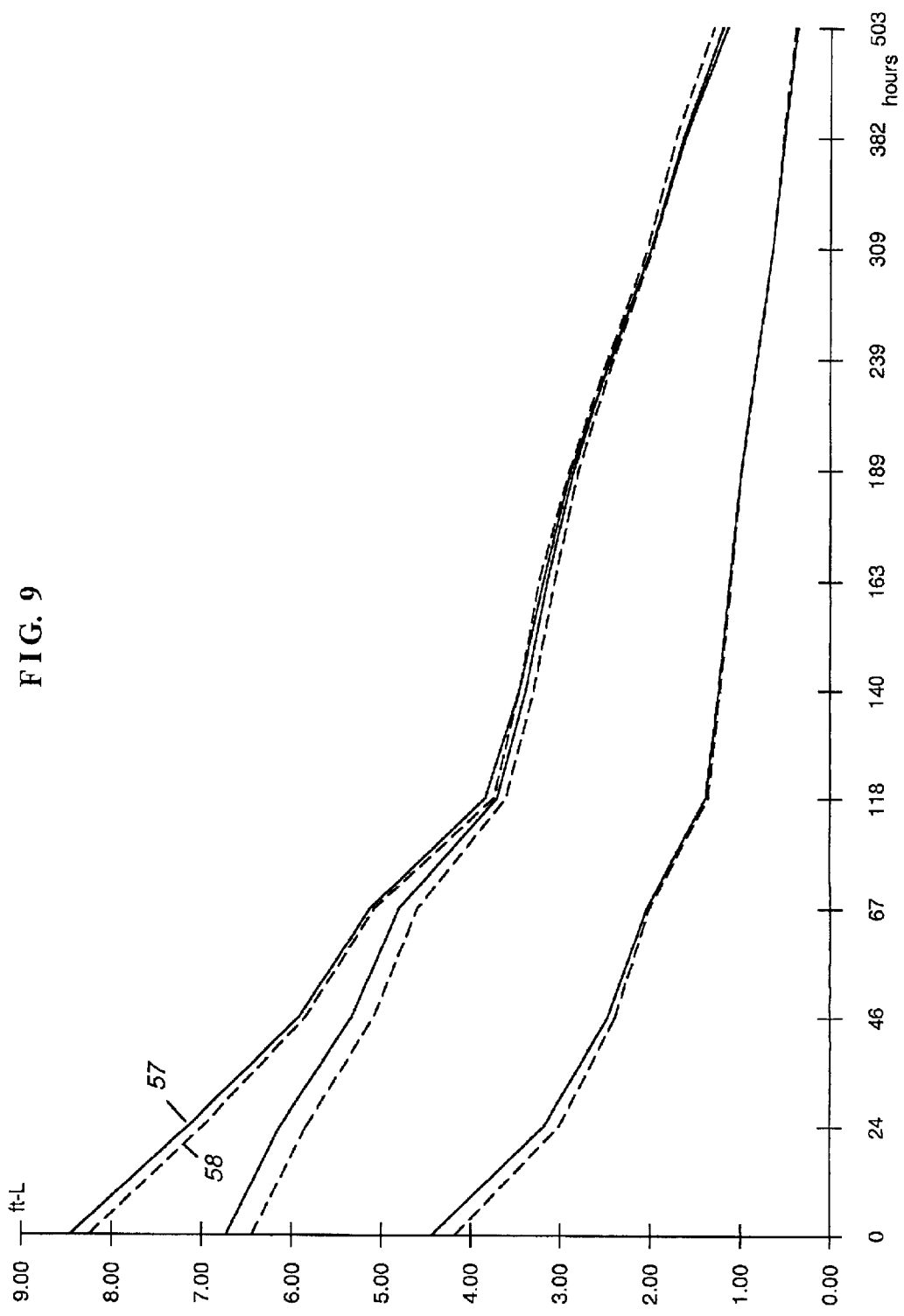
FIG. 9 is a chart of data from a second power supply test.

The data for this test is plotted in FIG. 9. Again, phosphor coated in accordance with the invention fared better than particles coated in accordance with the prior art. The data appears to converge after approximately 118 hours. However, at this time, the lamps are below one half of initial brightness, which is the definition of lamp life. Lamp life is normally far longer in normal use. A power supply test at 85° C. is a severe test designed to accelerate wear on a lamp.

Inverter Soak Test No. 2

A plurality of EL lamps made from a different phosphor were treated as described above with phenyltrichlorosilane were stored at 65° C. and 95% humidity, then briefly powered from an inverter while brightness (ft-L) was measured. The lamps were powered at approximately 50 VRMS, 250 Hz. EL40 is a green, alumina coated phosphor sold by Osram Sylvania. TNE400 is also a green, alumina coated phosphor sold by Osram Sylvania. As before, the last line of data was taken after the lamps had been removed from the soak chamber and permitted to dry before testing.

| Hours | uncoated EL40 | coated EL40 | uncoated TNE400 | coated TNE400 |
|---|---|---|---|---|
| 0 | 2.19 | 1.84 | 2.83 | 1.95 |
| 46 | 1.76 | 1.89 | 2.15 | 2.01 |
| 123 | 1.79 | 1.74 | 2.15 | 1.95 |
| 167 | 1.89 | 1.81 | 2.23 | 2.02 |
| 215 | 2.01 | 1.85 | 2.41 | 2.10 |
| 287 | 2.02 | 1.89 | 2.41 | 2.12 |
| 335 | 1.97 | 1.88 | 2.57 | 2.27 |
| 458 | 1.86 | 1.78 | 2.16 | 2.02 |
| 526 | 1.90 | 1.80 | 2.30 | 2.06 |
| 551 | 1.98 | 1.91 | 2.55 | 2.12 |

Figure 10:
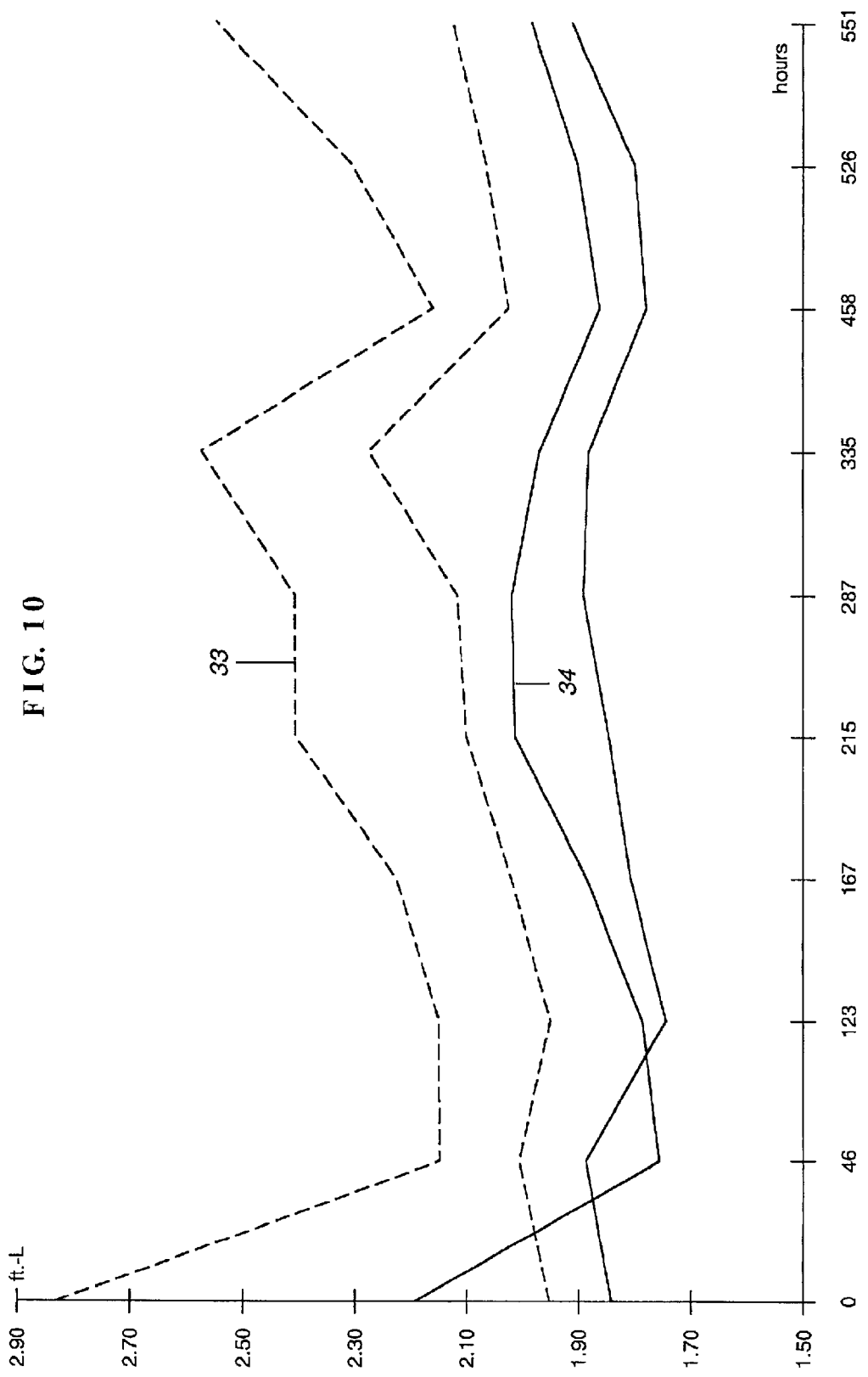
FIG. 10 is a chart of data from a second vapor soak test.

The data for this test is plotted in FIG. 10, wherein curve 33 represents uncoated TNE400, curve 34 represents coated TNE400. The second coating reduced brightness, particularly initial brightness but provided slightly more consistent operation. The power supply tests were more favorable.

Power Supply Test 3

A plurality of EL lamps treated as described above with phenyltrichlorosilane were stored at 65° C. and 95% humidity while continuously powered from a power supply at 80 VRMS, 200 Hz. Brightness (ft-L) was measured without interrupting power.

| Hours | uncoated EL40 | coated EL40 | uncoated TNE400 | coated TNE400 |
|---|---|---|---|---|
| 0 | 5.41 | 5.53 | 6.03 | 5.93 |
| 19 | 5.21 | 5.38 | 5.98 | 5.95 |
| 41 | 4.77 | 4.88 | 5.41 | 5.42 |
| 66 | 4.21 | 4.44 | 4.86 | 4.95 |
| 142 | 3.38 | 3.63 | 3.83 | 4.12 |
| 186 | 2.94 | 3.28 | 3.31 | 3.69 |
| 235 | 2.57 | 2.96 | 2.91 | 3.36 |
| 306 | 2.17 | 2.53 | 2.41 | 2.90 |
| 354 | 1.90 | 2.26 | 2.17 | 2.61 |
| 403 | 1.76 | 2.12 | 2.01 | 2.46 |

Figure 11:
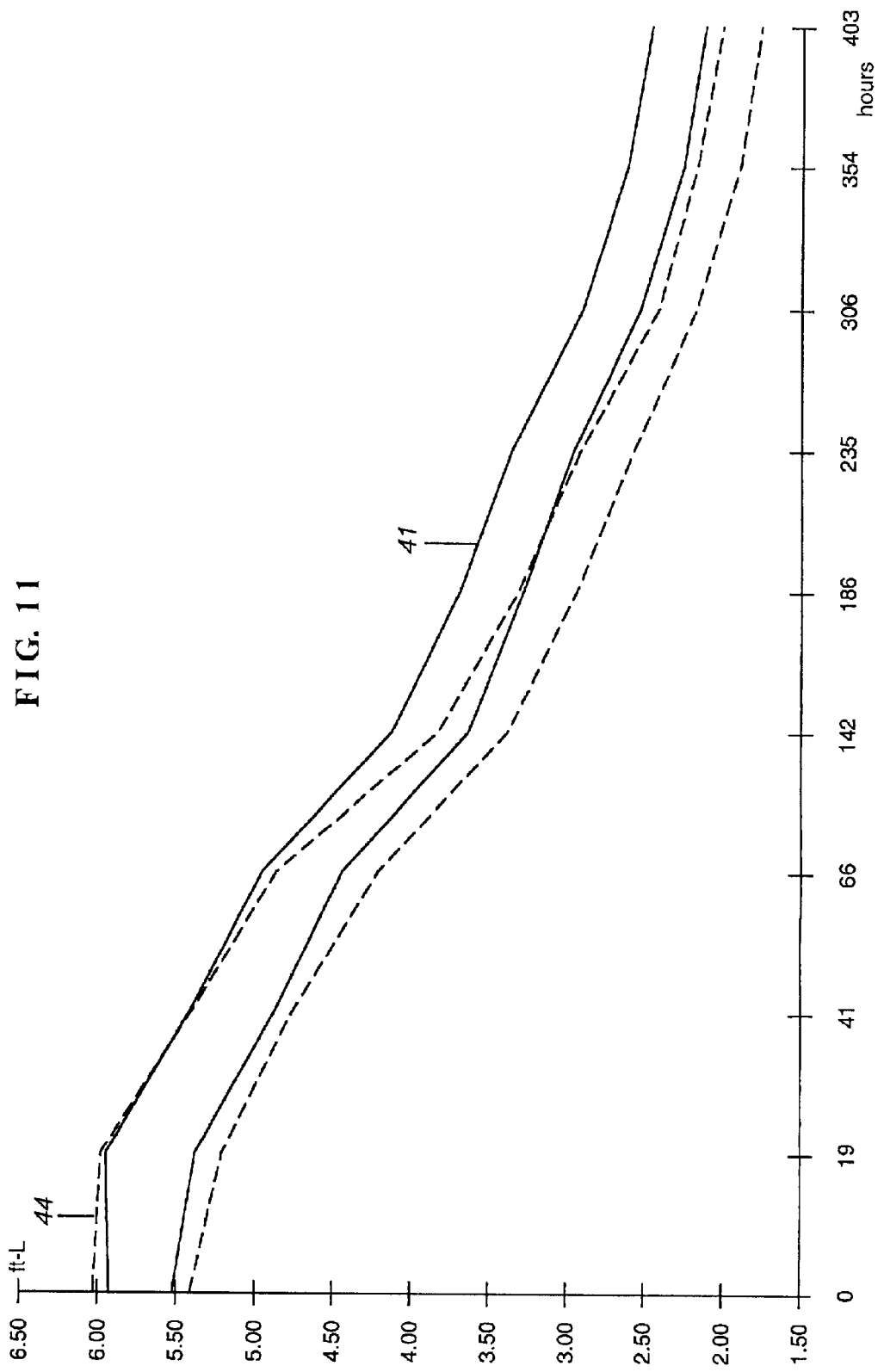
FIG. 11 is a chart of data from a third power supply test.

This data is plotted in FIG. 11, wherein curve 41 represents coated TNE400 and curve 44 represents uncoated TNE400. The curve for coated EL40 starts slightly below the curve for uncoated TNE400 but is slightly higher (brighter) at the end of the test. The lamps coated in accordance with the invention withstood the test better than uncoated lamps.

FIG. 12 is a cross-section of an EL lamp constructed in accordance with the invention. The various layers are not shown in proportion. The lamp includes transparent substrate 61, a sheet of bi-axially oriented plastic such as polyester or polycarbonate. Transparent front electrode 62 overlies substrate 61 and is a thin layer of indium tin oxide, indium oxide, or other transparent conductor. Phosphor layer 65 overlies the front electrode and dielectric layer 66 overlies the phosphor layer. Layers 65 and 66 are combined in some applications. Overlying dielectric layer 66 is opaque rear electrode 68. An optional backing layer 69 may also be provided, e.g. for sealing lamp 60. When doubly coated phosphor particles are used, there is no need for a sealing layer.

The invention thus improves the moisture resistance of an EL lamp by coating the lamp with one of a new group of materials. The coating process is improved in that the materials used do not present disposal problems as with solvent systems of the prior art.

Having thus described the invention, it will be apparent to those of skill in the art that various modifications can be made within the scope of the invention. For example, although nitrogen is a low cost, abundant, and convenient carrier gas, other carrier gases such as argon could be used instead. The data given is by way of example only. Data taken in a more humid (relative humidity>15%) or cooler (room temperature<23° C.) environment might be different.

What is claimed is:

1. A method for treating electroluminescent phosphor having a coating of metal oxide, said method comprising the steps of:
   a) providing a fluidized bed of coated electroluminescent phosphor;
   b) vaporizing water in a carrier gas to form a first gas;
   c) vaporizing an organotrichlorosilane compound in a carrier gas to form a second gas;
   d) passing the first gas and the second gas through the fluidized bed to form a siloxane coating on the electroluminescent phosphor.

2. The method as set forth in claim 1 wherein step d) is continued for approximately thirty minutes.

3. The method as set forth in claim 1 wherein said organotrichlorosilane compound consists essentially of an alkyl trichlorosilane.

4. The method as set forth in claim 1 wherein said organotrichlorosilane compound consists essentially of an aryl trichlorosilane.

5. The method as set forth in claim 1 wherein said organotrichlorosilane compound is selected from the group consisting of phenyltrichlorosilane, n-propyltrichlorosilanes and tert-butyltrichlorosilane.

6. An electroluminescent lamp comprising:
   a transparent electrode;
   a phosphor layer overlying said transparent electrode;
   a dielectric layer overlying said phosphor layer; and
   a rear electrode overlying said dielectric layer;
   wherein said phosphor layer includes phosphor particles having a moisture resistant coating and a metal oxide coating overlying each phosphor particle.

7. The lamp as set forth in claim 6 wherein said moisture resistant coating is formed by treating the phosphor particles in a fluidized bed with a mixture of water vapor and organotrichlorosilane.

8. A method for treating particles, said method comprising the steps of:
   a) providing a fluidized bed of the particles;
   b) vaporizing water in a first carrier gas to form a first gas mixture;
   c) vaporizing an organotrichlorosilane compound in a second carrier gas to form a second gas mixture;
   d) passing the first gas mixture and the second gas mixture through the fluidized bed to form a siloxane coating on the particles without applying heat to the fluidized bed or to the carrier gases.

9. The method as set forth in claim 8 wherein said passing step is carried out at ambient temperature.

10. The method as set forth in claim 8 wherein the first carrier gas is the same as the second carrier gas.

* * * * *